United States Patent

Hitt

[15] 3,654,448

[45] Apr. 4, 1972

[54] INSTRUCTION EXECUTION AND RE-EXECUTION WITH IN-LINE BRANCH SEQUENCES

[72] Inventor: Donald C. Hitt, Poughkeepsie, N.Y.

[73] Assignee: International Business Machines Corporation, Armonk, N.Y.

[22] Filed: June 19, 1970

[21] Appl. No.: 47,693

[52] U.S. Cl. ....................235/153, 340/172.5

[51] Int. Cl. ....................G06f 9/00, G06f 11/00

[58] Field of Search ....................235/153; 340/146.1, 172.5

[56] References Cited

UNITED STATES PATENTS

| | | | |
|---|---|---|---|
| 3,248,697 | 4/1966 | Montgomery | 340/146.1 |
| 3,440,619 | 4/1969 | Lehman, et al. | 340/172.5 |
| 3,518,413 | 6/1970 | Holtey | 235/153 |
| 3,533,065 | 10/1970 | McGilvray et al. | 340/172.5 |

*Primary Examiner*—Charles E. Atkinson
*Attorney*—Hanifin and Jancin and Robert Lieber

[57] ABSTRACT

Instruction re-execution for error recovery is enhanced by function skipping conditional branches in the execution control sequence. Branches continuing the main execution stream control execution and re-execution of basic functions and ancillary verification and saving functions required for error recovery. The latter functions are organized for rapid execution so as not to unduly lessen the execution throughput rate of the system. Ancillary functions include checking of particular basic function result signals and associated ancillary function control signals, 'scratchpad' saving of the particular function result signals in fast access general purpose buffer storage and setting of re-execution branch conditions to signal for skipping of basic functions when re-executing instructions after basic function result signals have been saved. Function skipping branches are taken therefor only in late re-execution; i.e. only when the re-execution branch condition for function skipping has been set prior to occurrence of error in execution. In the function skipping branch previously saved basic function result signals required for continued execution are obtained directly from fast access buffer storage, thereby eliminating original operand signal handling and arithmetic or logic processes of the skipped function. This is especially useful as the associated operand signals may no longer be available at re-execution time. The re-execution branch condition for function skipping is reset at conclusion of each instruction execution control sequence. Foregoing control organization has the advantage that verified and properly saved basic function results need not be reprocessed and recalculated during error recovery. Also by virtue of the standardized organization of the branch the controls may be adapted piecemeal to a variety of different system recovery functions with minimal cost/performance degradation.

14 Claims, 8 Drawing Figures

INVENTOR
DONALD C. HITT

BY Robert Lieber

ATTORNEY

INSTRUCTION EXECUTION AND RE-EXECUTION WITH IN-LINE BRANCH SEQUENCES

BACKGROUND OF THE INVENTION

1. Field of the Invention

This invention relates to data processing control systems and particularly to improvements in the design of sequence control sections thereof for error recovery operation.

2. Description of the Prior Art

U.S. Pat. No. 3,248,697 issued to Montgomery describes a system with an instruction re-execution function conditioned upon the state of a "Do Not Return" trigger which is set early in the instruction execution sequence. So long as that trigger remained set the control sequence for the current instruction would be re-executable. The trigger would be reset at an advanced stage of the instruction execution sequence coinciding with obliteration of intelligence essential to re-execution of the instruction. The sequence thereafter would not be re-executable and more circuitous corrective procedures would be required; for example re-execution of several previous instructions.

In the present system the latter eventuality is never reached. The control sequences for instruction execution are pre-arranged by design so that destruction of intelligence signals vital to re-execution of the immediate instruction sequence is always preceded by saving operations securing representations of the same or alternate intelligence in fast-access back-up storage. Control sequences for individual instructions thereby remain continually re-executable via reference to the saved intelligence representations in back-up storage.

As a general proposition it is not novel to provide for saving of volatile instruction intelligence signals in anticipation of error recovery requirements. Co-pending patent application Ser. No. 697,738, now U.S. Pat. No. 3,533,065, filed Jan. 15, 1968 in behalf of B. L. McGilvray et al. discloses a processor sequence control system in which saving of potentially volatile intelligence is utilized as a recovery expedient. Furthermore in respect to a later discussed function verification feature hereof a second co-pending application by Bee et al. Ser. No. 697,742, now U.S. Pat. No. 3,539,996, filed Jan. 15, 1968 discloses a back-up storage feature wherein timing of the back-up storage function is coordinated with completion of a related function in the main stream of instruction execution sequencing.

A third co-pending patent application of E. J. Lang et al. Ser. No. 698,595, now U.S. Pat. No. 3,564,506, filed Jan. 17, 1968 contemplates an error recovery instruction re-execution scheme in which control sequences of particular instructions are segmented by design into discrete non-overlapping and non-dependent function segments. The re-execution sequence is permitted to skip over successfully completed segments by branching. For later consideration it is noted that the last mentioned application also discloses a condition trigger which is set to indicate obliteration of source operand intelligence. A problem in this organization is that partially completed segments must be re-executed notwithstanding completion of an entire arithmetic or logical operational portion of the segment. This can delay re-execution processing and restricts the adaptiveness and usefulness of the control section organization.

Another co-pending application of Schnabel et al. Ser. No. 697,740, now U.S. Pat. No. 3,533,082, filed Jan. 15, 1968 introduces the concept of function re-execution by control sequences adapted to fetch function operands from saving buffers rather than from program-specified storage. The difficulty with this is that a dedicated system of saving buffers is contemplated for the saving function and logical manipulations of function operands may be repeated needlessly in situations where fast-access saving and retrieval of the associated function result would have been sufficient.

The main problem in the art exemplified by the foregoing references is that the approach to expediting transient error recovery has been to expand system control sections leaving the execution controls basically intact. This of course leads to inefficient re-execution control. The present invention provides a control section organization and design method therefor which represent an effective solution to this problem.

SUMMARY

The present invention seeks to provide for improved error recovery by efficient and selective skipping of arithmetic and logic functions in the re-execution of particular instructions. An object is to conserve re-execution time and control hardware by including the selected function skipping operations as conditional branches in control sequence which are shared for execution and re-execution.

When the branch condition is not set during either execution or re-execution of the instruction the manipulative logic function branch of the control sequence is taken. This branch includes the basic logical process of the instruction — such as the handling of argument or operand signals and the development of a result manifestation by logical manipulation of the argument signals — and several ancillary operations required to save the result for possible use in re-execution via the function skipping branch. The ancillary operations are organized for rapid execution in order to avoid unnecessary degradation of system performance. These include checking operations and result saving operations.

The ancillary checking operations feature checking of the result manifestation developed in the basic logic function operation and checking of the control signal which controls the ancillary result saving operation. The saving operation involves transfer of the logic function result signals to selected sections of fast-access buffer storage.

A related feature or aspect of this checking is that control and/or process signal errors are not permitted to destroy potentially critical information in fast-access buffer storage.

Another feature is that the function execution and function skipping branch control sequences merge into a continued execution sequence in which the saved function result receives further handling.

Another feature is that the argument signals may be subject to erasure or cancellation in execution of the logic function. Thus, by saving representations of result signals the need for more circuitous protection of the argument signals is avoided.

Another important feature is that by saving the result signal representations in general purpose fast-access scratchpad storage, it becomes unnecessary to provide special purpose system hardware for this purpose.

Another important feature is that the subject logic function skipping branch for re-execution is incorporated as a standardized feature in the in-line execution control sequence of each system instruction which lends itself to logic function result saving. Thus the increase in the size of the control section due to the error recovery function may be efficiently held to a minimum, since the ancillary saving functions required for recovery can be neatly integrated in the basic execution function control package without unduly degrading execution performance.

Still another feature is the cost/performance improvement provided by the direct utilization of saved results in re-execution branches, as compared to the processes of result generation in respective execution branches.

Another feature is the delaying of completion of the logic function result saving function in sequence time until the result signal representation and the saving control signal have been checked by respective check circuits in the arithmetic and control sections of the system.

Yet another feature of a particular embodiment of application of the invention is that for certain instruction sequences a relative address — which is produced in the main branch sequence by addition of the contents of a general system register B (register contents being represented herein as [B]) designated by the instruction and a displacement quantity D contained in the instruction signal field — is saved in a general system register B′ as a said basic logic function result. Thus if transient error occurs in the system after this saving stage of execution the function skipping branch is taken at re-execution. This means that the execution controls refer directly to B′ for relative address handling without repeating the functions for generating [B] + D. It will be seen that this is quite convenient when, for example these certain instructions permit overwriting of the B register and/or obliteration of the D field of the instruction during the course of execution. The initial [B] and D quantities may not be recoverable in such instances and, in any event, their saving would not be as effective as the present feature of saving the [B] + D result.

The foregoing and other features and objects of the present invention will be more fully appreciated by considering the following detailed description of specific embodiments thereof with reference to the accompanying drawings.

DETAILED DESCRIPTION OF PREFERRED EMBODIMENTS

Figure 1:
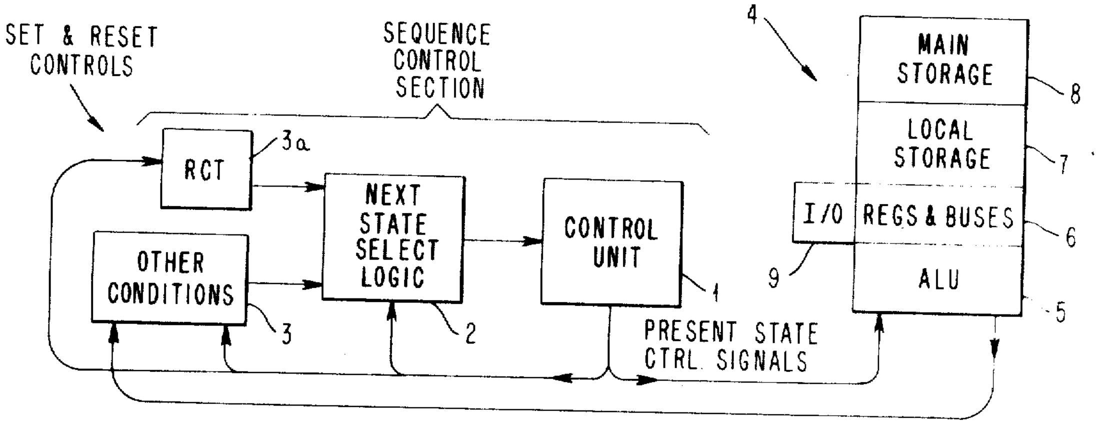
FIG. 1 is a schematic block drawing of a typical environmental system with respect to which the operation of subject invention is explained.

Environmental systems of a type which may be adapted in accordance with the present invention are suggested in FIG. 1. Systems of this type are completely described in U.S. Pat. No. 3,400,371, Amdahl et al., assigned to the assignee of the present application and U.S. Pat. No. 3,453,600, T. S. Stafford et al. A preferred form of control section in such systems includes a control unit 1, which preferably would comprise a microprogram store and cycle clocking organization of a type described in the above Stafford et al. patent and in the IBM Systems Journal, Vol. 6, No. 4, 1967, pages 222–241 by Tucker.

As described in the foregoing article by Tucker, such control sections further comprise selection circuits 2 for selecting sequences of control microinstructions in order to compose microprograms for executing program instruction functions and other process functions of the system. In a microprogrammed system the circuits 2 would develop sequences of digitally coded addresses for selection of sequences of microinstructions stored in unit 1. Typically an address is composed by selecting a digital portion of the current output microinstruction and combining such with branch digits. The branch digits may be determined by selecting states of system binary components 3 according to selection codes in the current microinstruction. Such states may be manifested in system hardware registers, special usage condition latches or triggers, general usage condition triggers, etc., so long as such are accessible for selection immediately when required to control branching.

A special usage branch trigger introduced here which is provided especially for the present invention is shown separately at *3a* in FIG. 1. This Re-execution Condition Trigger RCT controls the logic function skipping branch featured herein and discussed in depth below.

As is well understood by those skilled in the art the foregoing controls may also be constructed by sequence counting circuits of less systematic organization. It is understood further that the main purpose of the microinstruction or other control signals produced by foregoing controls is to furnish control signals to other elements 4 of the processing system. Typically such other elements would include an ALU (Arithmetic Logic Unit) 5, registers and busses 6, fast-access local storage or scratchpad storage 7, slower access program storage or main storage 8 and input/output connection circuits or channels 9.

The operation of microprogram controlled data processing systems of the kind shown in FIG. 1 is well understood and appreciated by those skilled in the art and requires no further elaboration, with the exception of remarks herein concerning the handling of condition setting and sequence branching within the control section 1–3. An innovative aspect of this is explained with reference to FIGS. 2 and 3 of the drawings.

Figure 2:
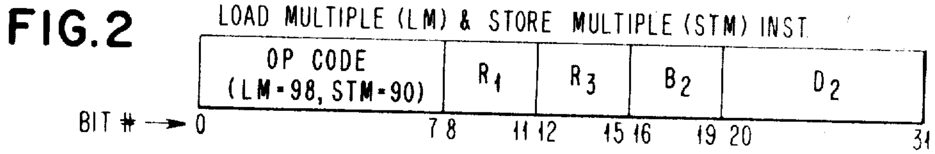
FIG. 2 shows the instruction format of two particular program instruction codes decipherable by the control section of the foregoing environmental system and with respect to which a particular application of a preferred embodiment of the subject invention is explained.

FIG. 2 shows the format of typical program instructions Load Multiple (LM) and Store Multiple (STM). These are executed in foregoing environmental systems by microprogram or execution control sequences which include stages of development and usage of relative address quantities. It will be shown that the relative address development stage of execution may be treated as a function subject to re-execution branch skipping in the context of the present invention.

The LM and STM instructions contain 32 code bit signals. An eight-bit group denotes the operation code (OP CODE) in hexadecimal notation. Three three-bit groups designate general registers R1, R3, B2 which are usually found in the general purpose section of the scratchpad local storage 7 of the system. Finally, a 12-bit group represents a displacement quantity D2 which, in the instruction execution control sequence, is added to the contents of base register B2 to form a relative address. The latter quantity is retained in a register B. The possibility that B=B2 is not excluded.

The relative address designates a position in program storage which is to be interrogated or written into during the remainder of the instruction execution control sequence. Instruction execution begins with an instruction fetching subsequence 20 by which the instruction is retrieved from system program storage. Thereafter as is well known, execution sequences are branch selected (not shown in the drawing) according to the particular operation code of the fetched instructions.

For LM and STM instructions the operation to be executed is a transfer of information signals between a series of general purpose system register — the first and last such being denoted respectively by the R1 and R3 quantities of the instruction field — and corresponding locations in system memory, the latter denoted by the execution generated and incremented relative address quantity.

As mentioned above the relative address is derived by adding the displacement quantity D2 to the contents of the base register specified by B2, this operation being denoted [B2] + D2 (read as "contents of B2 plus D2"). Thus, in LM execution (*22a*, 23, 24) contents of program storage address specified by [B2] + D2 + $x$ ($x$ = word unit address increment) are loaded into the series of register specified by R1 (unit incremented), the sequence terminating (24) when R1 (unit incremented) = R3. Likewise STM execution (*22b*, 23, 24) requires transferral of contents of registers R1 (unit incremented) to program storage addresses [B2] + D2 + (unit word address increment) until R1 (incremented) = R3.

One observes incidentally that unit register address increments are obtained by adding only 1 to R1 and unit program store address increments are produced by adding four to the previous program store address. This is because in the particular environmental system of this embodiment program words have 32 bits and registers, such as B2, R1, R2, hold words. However words are composed of eight-bit bytes, and storage addresses contain byte addressing bits in lowest order positions. Thus register to storage transfers effectively span four address units of storage.

Figure 3:
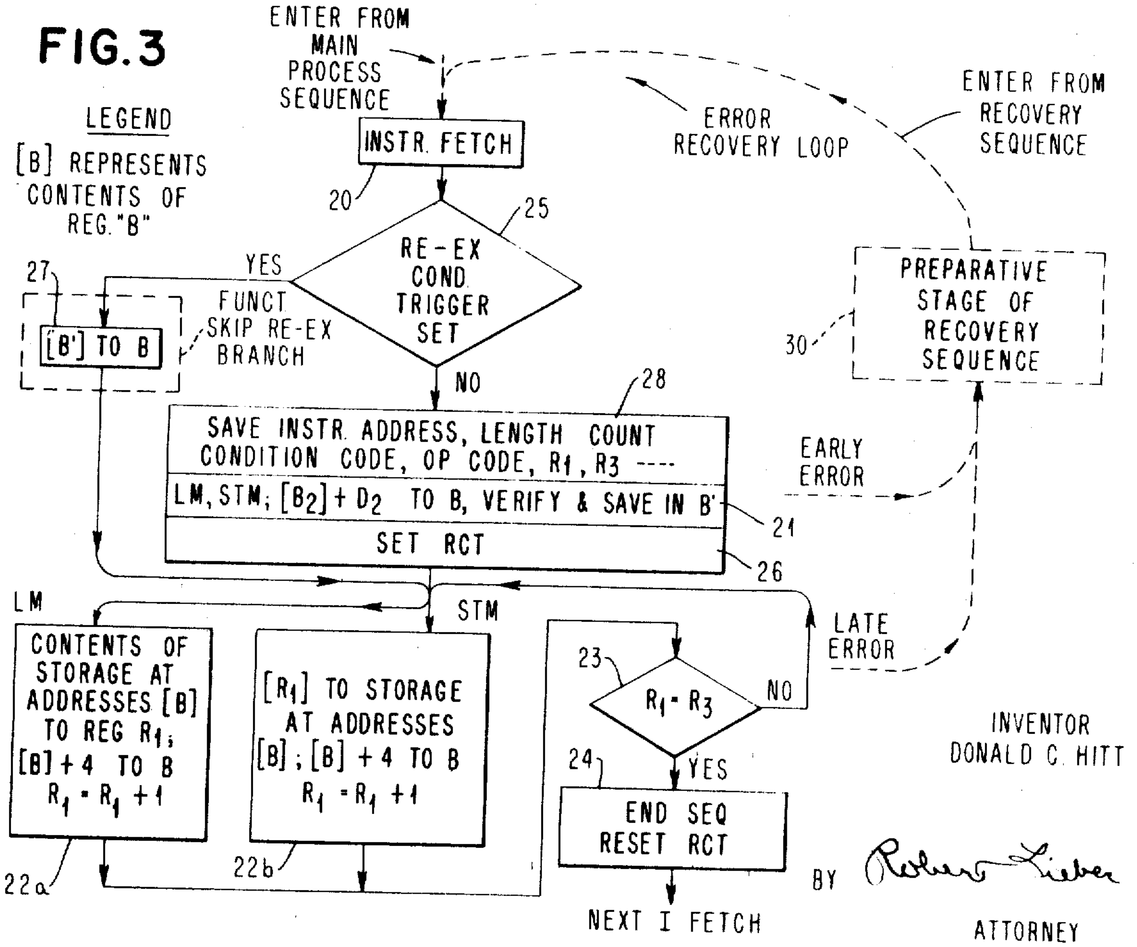
FIG. 3 is a flow diagram for explaining the sequence of operations and the control organization for the above-mentioned application of preferred embodiment.

The present invention can now be understood by referring to the specifics of the LM, STM instruction execution sequence in FIG. 3. The basic execution sequence includes an arithmetic phase 21 and a program storage transfer and arithmetic phase **22*a* or 22*b*** with interleaved ancillary functions.

After instruction fetch sequence 20, and ancillary program status saving functions discussed later, the quantities [B2] and D2 are added together (21) and the sum representing the required relative address is placed in a general register B selected by the microprogram. Ancillary checking, sum saving and function skip branch condition setting control operations, which are features of the present invention, are performed coincidentally at sequence stage 21. These operations will be described later.

In continuation of the LM sequence contents of storage at address given by the contents of register B (i.e. at address [B]) are transferred (sequence stage **22*a*) to the register designated by R1 and the location designations [B] and R1 are incremented by unit amounts (i.e. four for [B] and one for R1). These basic functions of the execution sequence are repeated assuming error-free operation until the incremented value of R1 is equal to the number R3 as shown at 23. At that point ending sequence 24 would be performed. The ending sequence includes the ancillary operation of resetting the branch condition previously set in RCT at stage 26** and other basic operations required to complete the execution sequence in preparation for the next Instruction Fetch.

For the STM instruction the reverse storage transfer operation **22*b*** is executed. Contents of successive registers R1 are transferred to successive program store locations at addresses obtained by incrementing the initial relative address [B]. This continues until the incremented quantity R1 is equal to R3.

The control sequence for the generation and temporary storage at B of the initial relative address [B2] + D2 is selected by branching conditionally at 25 on the state of the special purpose Re-execution Condition Trigger RCT shown at **3*a* in FIG. 1. The other leg 27 of this branch permits restoration of the initial address, without re-execution of the addition process, from a saved back-up representation of [B2] + D2 in a register B′ produced in an earlier execution of 21 (note "-Verify & Save in B′" stated at 21). Thus, at appropriate later considered instances of re-execution the simple operation 27 is performed instead of the obviously more circuitous operation sequence 28, 21, 26** concluding with the setting of RCT.

When error is detected the program is interrupted and the recovery sequences may be initiated. The latter sequence includes a preparative stage 30 and re-execution stage, the latter accomplished by simply re-entering the instruction fetch sequence 20. The preparative includes housekeeping functions not directly relevant to the recover process of the invention and status restoration operations which are relevant only to the extent that they prepare the system for the re-entry to the execution sequence. The status restorative operations are executed upon program status intelligence stored at stage 28 of the previous execution sequence; specifically the address, operation code, length count and R1, R3 designations of the last-fetched instruction. It may be noted that B2 and D2 are not saved and indeed may even be completely erased at stage **22*a* or 22*b***.

For early errors (i.e. before RCT is set at 26) the re-execution sequence branch 25 is the same as the initial execution branch and the function for arithmetically regenerating [B2] + D2 is re-executed. This means incidentally that B2 and D2 must be re-acquired intact through fetch stage 20.

For late errors (RCT previously set) branch 27 is taken to restore saved function result [B′], which represents the sum of [B2] and D2, to register B. Then the operations **22*a* or 22*b*, 23 and 24** are immediately re-executable.

Figure 4:
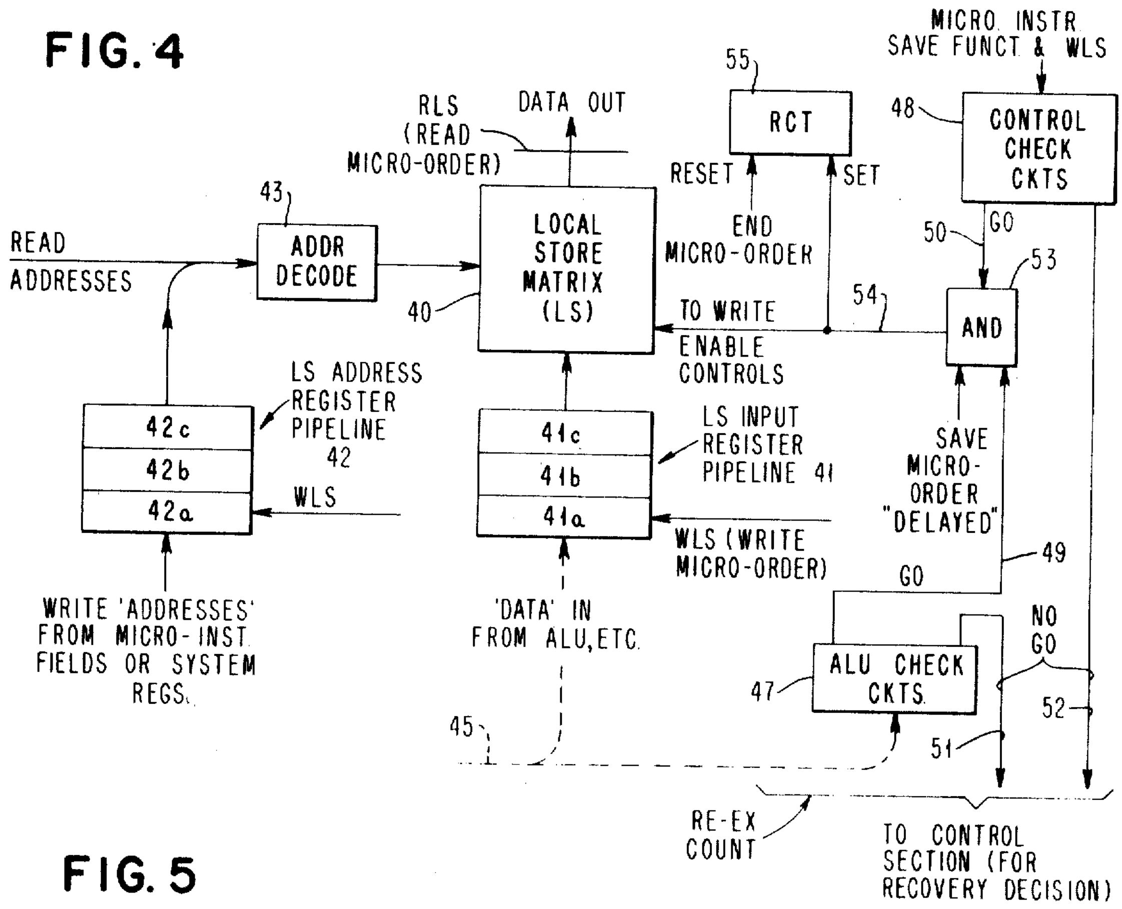
FIG. 4 illustrates a "pipe-line" signal delaying feature of the system circuit hardware for coordinating control checking and ALU result signal checking operations of the environmental system with the result signal saving function of the invention so that wrongful obliteration of the earlier and possibly vital contents of the saving buffer is averted.

Referring to FIG. 4 it will be seen that the foregoing operations are coordinated so that the saving of [B2] + D2 in B′ is delayed until after [B2] has been checked as an arithmetic result and coincidentally until the microinstruction containing the Write Local Store (WLS) micro-order for controlling the saving transfer (refer to the above mentioned article by Tucker in the IBM Systems Journal for the distinction between the terms microinstruction and micro-order; noting simply for the present discussion that a micro-order is an operation designating code segment of a microinstruction) has been checked. For this purpose it will be seen that the fast-access local store matrix 40 which contains the registers B, B′ R1, R2, etc. is written into from a system of queueing registers 41, the corresponding input addresses being received through the parallel system of queueing registers 42. Word signals written into the store 40 propagate successively in parallel form through stages **41*a*, 41*b* and 41*c* of the queueing register while corresponding address signals slightly advanced in sequence phase propagate in parallel form through stages 42*a*, 42*b* and 42*c* of the address register queue. The phase lead of the addressing signals should be sufficient to permit time for decoding each address in decoding circuits 43 and for energizing the appropriate drive lines of the matrix 40 in coordination with the arrival of the corresponding intelligence to be stored at the outlet of register stage 41*c*. Details of the read function of the same matrix with respect to the output lines 44** and the associated Read Local Store (RLS) micro-order are omitted as not relevant to the present discussion.

It may be seen from the drawing, noting specifically the broken line designated 45, that arithmetic result signals entering storage queue 41 are checked by ALU check circuits 47, the check being completed by the time the result enters register 41c. Coincidentally the control microinstruction which contains the "Save" micro-order directing the saving transfer of the [B2] + D2 sum result into B′ is checked for correct parity by check circuits 48. The "Go" (i.e. "valid") check outputs 49, 50 of respective check circuit 47, 48 are sampled at AND-gate 53 by the delayed (i.e. latched) "Save" micro-order. "AND" output 54 is thereby applied as enabling control to the "write" drive gating circuits of matrix 40 in coordination with the arrival of the checked [B2] + D2 result at **41*c*. Output of And 53** also sets trigger RCT.

Conversely the non-check condition signified by a "No Go" signal from either circuit on respective output lines 51 or 52 is transferred to the control section to indicate that error interrupt branching is required at that stage of operation.

The net effect of the use of foregoing check operations to condition the B′ save and RCT setting operations is that the function skipping branch 27 (FIG. 3) is taken in re-execution only after B′ data and its saving control have been previously verified in execution. This means that saving errors are not compounded in re-execution and also that saving errors do not obliterate other intelligence in B′ which may be vital to other system processes. Note especially that a control error can "-detour" the system to a B′ saving transfer which is unrelated to the immediate process.

One final observation. The ancillary operations of checking, saving in B′, and setting RCT are preferably performed as rapidly as possible so that the main execution function of deriving and summing [B2] and D2 is not unduly delayed. Otherwise system throughput would suffer. It is for this reason that the fast access store 40 and queues 41, 42 are employed. It will be appreciated by those skilled in this art that due to such employment there need be no pause or delay between the issuance of the microinstruction for generating and saving [B2] + D2 and the next microinstruction of the same microprogram.

Figure 5:
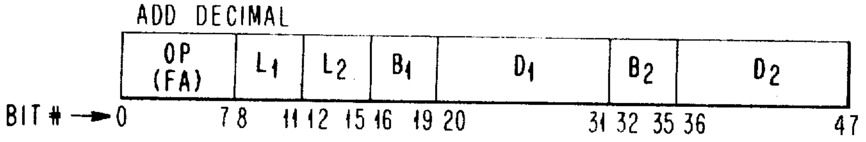
FIG. 5 shows the format of a Variable Field Length (VFL) instruction ADD DECIMAL to which the control modification of the present invention may be applied in the manner shown in FIG. 6.
Figure 6:
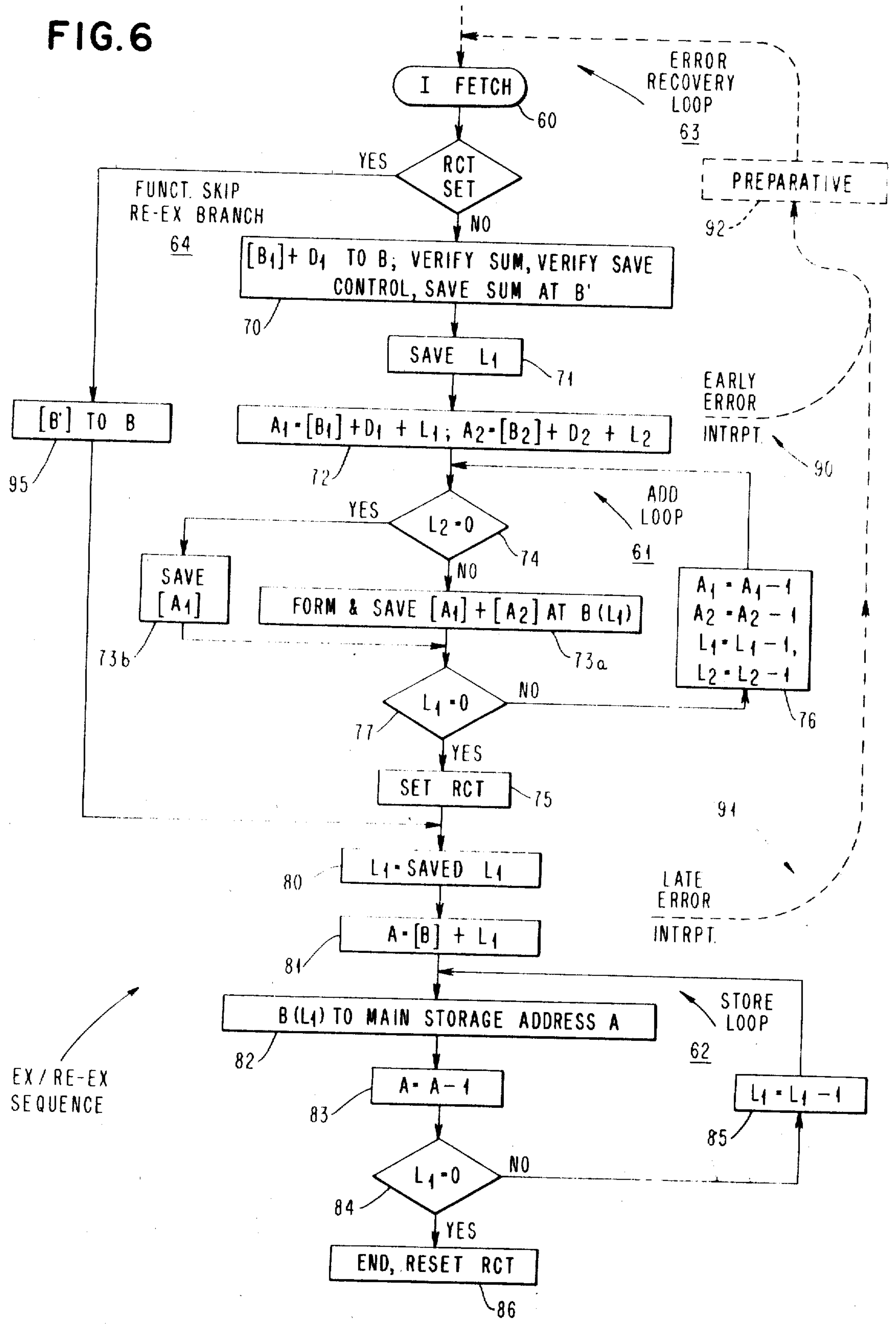

Another example of utility of the foregoing branching, checking, result saving and trigger setting technique is suggested in FIGS. 5 and 6. FIG. 5 shows the 48-bit field format of the Add Decimal program instruction which is another instruction executable in the foregoing environmental system. Basically the Add Decimal instruction calls for addition of a variable-length series of pairs of numbers which are stored at a series of pairs of program storage locations designated by successively incremented quantities [B1] + D1 and [B2] + D2 and storage of the addition results at the program storage locations designated by the incremented value of [B1] + D1. The lengths of these series of numbers to be added (which numbers may be referred to elsewhere as first and second operands), are respectively designated by the quantities L1 and L2 contained in the instruction field. However the present system contemplates a program restriction that limits the length to be no greater than L1. Hence if L2 is less than L1 a string of zeros is substituted in the place of the second operand to allow continuation of the addition function until the field L1 is exhausted.

As may be seen in FIG. 6 the ordinary operations of the instruction include the usual I fetch stage, denoted by 60, followed by a branch selection of control operations for performing either the basic operand addition operations (Add Loop 61) and ancillary operations for the error recovery function or a skip branch operation which effectively by-passes these functions in re-executions which follow late error (i.e. error after RCT has been set). Results of Add Loop operations are saved in fast access buffers discussed later.

After all Add Loop operations 61 saved addition results (multiple words) are transferred from above mentioned fast access buffers to program storage one word at a time. This operation is controlled by a micro sequence store loop 62.

Thus it will be understood that in the present preferred form of execution of this instruction all of the operand additions are processed before any results are stored in program storage. Only after the last addition are results moved from temporary fast access storage to a more permanent situation in slower access program storage at first operand address locations [B1] + D1 + ( ).

Error recovery loop sequence 63 and a function skipping re-execution branch 64 are also provided in the control section. These will now be separately discussed. Branch 64 is conditioned upon the set state of RCT, the state of RCT being examined after I Fetch stage 60.

When RCT is in the reset state the basic execution branch 70–77 plus a number of iterations of loop 61 is taken. At conclusion of this branch RCT is set and the main sequence is continued with operations 80, 81 and a number of iterations of loop 62.

Early and late error interrupts 90, 91 occuring respectively prior to or after the setting of RCT at stage 75 evoke the error recovery loop sequence 63. The latter includes preparative stage 92 comprising operations relating to system housekeeping and to restoration of system program status thereafter to the status preceding the last-executed I fetch, to the extent that status information is available for restoration.

In connection with the last remark it is recalled that in some instances of execution of Add Decimal the original B1 and D1 intelligence may no longer be available for recovery if the instruction field containing these designations has been overwritten in program storage. In such instances of course only the saved result intelligence [B1] + D1 is available for recovery through the function skip re-execution branch 64.

In the latter instance of course assuming an early error it will be seen that since nothing has been written into program storage the original B1 and D1 designations are available for reconstruction from the refetched instruction field and the instruction may be simply repeated by tracing the sequence 70–72 and loop 61, etc.

On the other hand when a late error occurs it will be understood that such occurs only after setting of RCT (control step 75) signifying to the system that the storage phase of the sequence namely stages 80–81 and loop 62 has been at least partially executed. In the latter event therefore skip branch 64 is selected after re-execution of I Fetch. Operation 95 ([B'] to B) restores the initial address quantity [B1] + D1 to B, and since all operand addition results have been saved in registers associated with the decremented value of L1 (namely B(L1)) it is possible to skip directly to operations 80, 81 and loop 62 for the program storage result entry phase of re-execution. Since the sequence 70–72 + loop 61 is or may be quite lengthy it is seen that the function skip branch 64 results in a considerable saving of processing time in the re-execution phase of recovery.

It will be understood by those skilled in the art that the foregoing sequence descriptions are only representative of the environmental applications of the result save/trigger set/result use/re-execution late error branch technique of the invention. It will be understood that each of the foregoing described sequences may include additional functions not relevant to the present discussion. For example input output transfer functions may be interleaved at arbitrary stages of the foregoing sequences by the "break-in" process described in the foregoing U.S. Pat. No. 3,453,600 to Stafford et al. Also, various other processes incidental to system housekeeping, system monitoring, or the like may be interleaved in the execution and recovery sequences.

Figure 8:
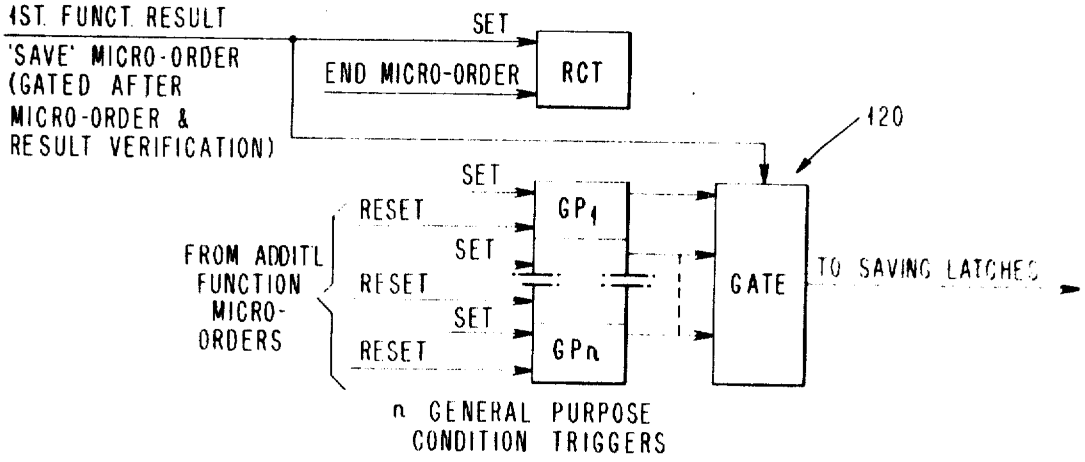
FIG. 8 indicates a preferred arrangement of logic for condition trigger setting and usage for obtaining the multiple skip branching effect of FIG. 7.
Figure 7:
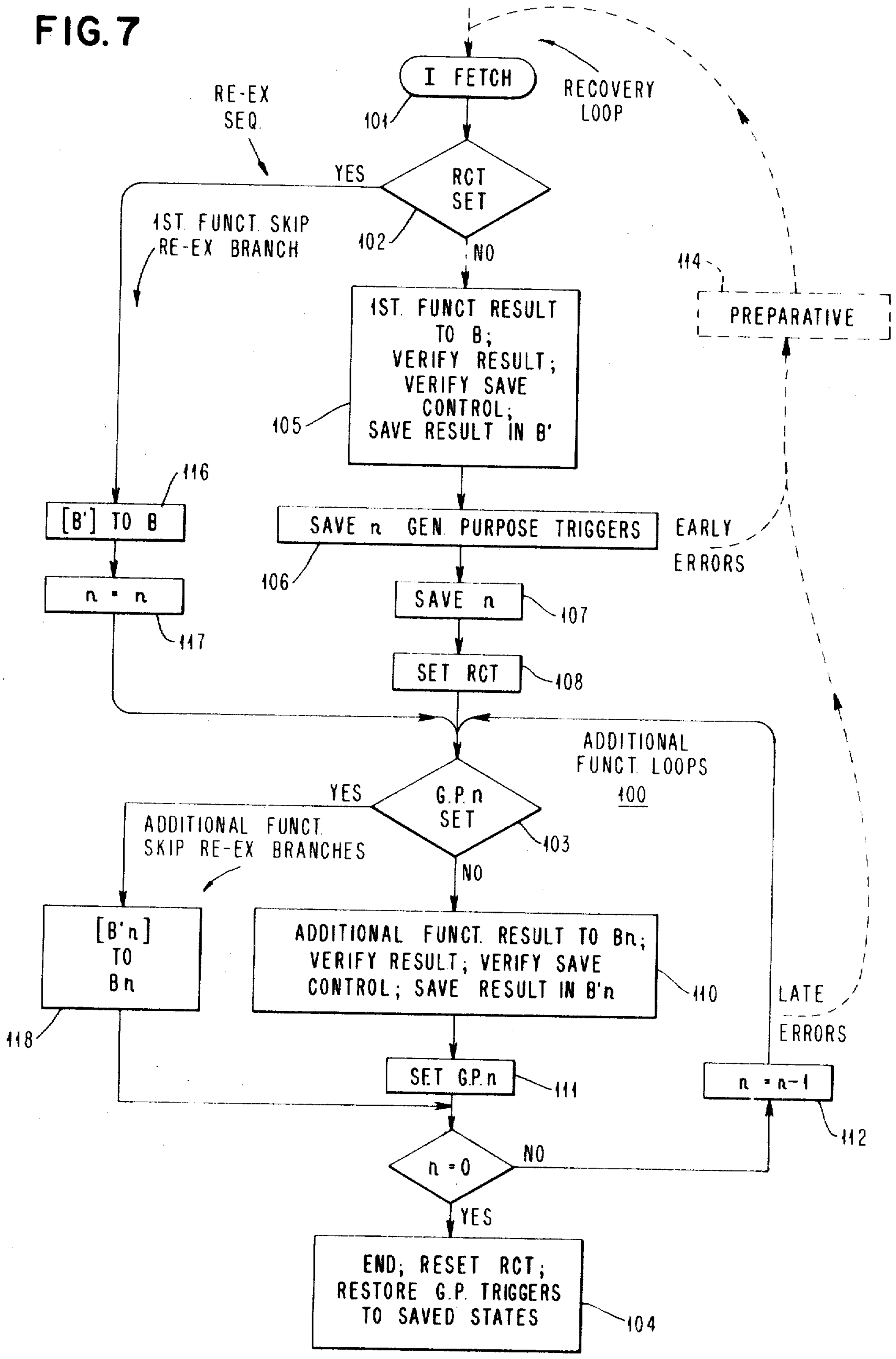
FIG. 7 shows a second embodiment of the invention wherein multiple conditional branches, for skipping directly to multiple saved results for continued result processing, are incorporated within the execution control sequence for a single instruction.

Referring to FIGS. 7 and 8 an alternate embodiment of the invention is shown by which multiple function skipping re-execution branches to saved results can be introduced during the re-execution of an executed sequence. For explanational purposes the additional functions for which skipping re-execution branches are provided are shown as organized into a sequence loop, although it will be understood that such is not necessary to the implementation of the skipping branches.

As before the instruction execution — re-execution sequence starts with an I fetch indicated at 101, progresses through a first skip branch selection stage 102 and other skip branch selection stages 103, concluding with an end sequence stage 104.

Between selections of branch 102 and branch 103 the basic execution sequence includes a stage 105, of formation of an arithmetic or logical handling result and transferral of that result to both an immediate reference register B and a saving register B'. At approximately the same time in the execution sequence system conditions stored in a number *n* of general purpose condition triggers, which presently contain system status information not particularly relevant to the present instruction execution sequence, are transferred to back-up saving latches provided for this purpose (stage 106) and the number *n* of such saved trigger conditions is also saved (stage 107).

As the verified result is transferred to B' in stage 105 the trigger RCT is set (stage 108). At successive branches 103 states of the *n* general purpose triggers are successively examined and respective additional function operations are performed. As suggested at 110, 111 with each formation of additional function result signal, the result and the control signal for saving are verified. Then the result is saved in a specified register Bn and the associated general purpose triggers are restored to the states saved at 106.

When error occurs the usual preparative monitoring and housekeeping operations 114 are performed in the interrupt error recovery loop and the I fetch sequence 101 is re-executed. In this mode of operation if RCT and any of the general purpose triggers have been previously set corresponding function skipping re-execution branches are taken. If RCT is set the re-execution branch 116, 117 is taken. The saved (first function) result is transferred from B' to B the count *n* saved at 107 is restored to registration. This eliminates the first function sequence 105–108.

If general purpose triggers have been set in a previous execution, corresponding saved verified results are transferred in function skipping re-execution branches 118 between corresponding registers B'n and Bn, enabling the control section to skip the sequence stages 110, 111 of the respective functions.

The handling of the setting of RCT and the *n* general purpose triggers is indicated schematically in FIG. 8. As shown the gating of the result saving/setting signal to RCT is delayed until completion of verification of the result signal and the saving control micro-order. The same signal is used to control the gates 120 for transferring the general purpose trigger states to respective back-up latches. The setting and resetting of the general purpose riggers is accomplished under micro-order control for the operations 111 of FIG. 7. Not shown controls and connections permit restoration of back-up latch states to respective general purpose triggers at end stage 104 of FIG. 7.

We have shown and described above the fundamental novel features of the invention as applied to several preferred embodiments. It will be understood that various omissions, substitutions and changes in form and detail of the invention as described herein may be made by those skilled in the art without departing from the true spirit and scope of the invention. It is the intention therefore to be limited only by the scope of the following claims.

What is claimed is:

1. In a data processing system having program storage, fast-access storage, error checking facility and a sequence control section adapted to produce successive first and second control sequences of multiple elementary processing operations for executing a program instruction, said first sequence comprising calculation and verification in said checking facility of a relative address quantity by arithmetic summation of displacement and base register quantities designated by the instruction intelligence and said second sequence comprising utilization of said relative address quantity to address said program storage in a further processing operation relative to said relative address involving participation of said checking facility, the control section improvement comprising:

adaptation of said control section to provide operations ancillary to error recycling within said first sequence; said ancillary operations including operations relative to said fast-access buffer storage to save therein a manifestation of the relative address produced and checked earlier in said first sequence and a terminal operation to set a skip branch condition;

said control section adapted further to provide operation to reset said skip branch condition prior to initial entry into said instruction execution control sequence; and upon completion of said second sequence;

said control section adapted further to respond to error indication by said checking facility to provide re-entry into said instruction execution control sequence at a stage subsequent to the said skip branch reset operation, with selective skipping of said first sequence conditioned thereby upon earlier occurrence of said skip branch set operation, said first sequence skipping including control operation to provide for retrieval of said saved relative address from said fast-access store followed directly by said second sequence.

2. The control section of claim 1 wherein said checking facility includes:

first means for checking said relative address quantity in the course of development of said quantity;

second means for checking the control signals which control said ancillary saving and skip branch condition setting operations; and means controlled by said first and second checking means for delaying execution of said ancillary operations and conditioning said delayed execution upon completion of the checking of said address quantity and control signals.

3. In a data processing system adapted to recycle instruction handling control sequences in response to occurrence of error an improved sequence control section comprising:

re-execution control means settable to a plurality of states useful to condition sub-sequence branch selection in control sequences; and re-entrant sequence control means conditioned by said re-execution control means at a first predetermined stage of said sequence to select between alternate long and short branch sub-sequences of said control sequence which terminate coincidentally at a second predetermined subsequent stage of said sequence; said re-execution control means being settable to different said states by operations of said sequence control means occurrent only in said long sub-sequence and in a sub-sequent final stage of said sequence and not in said short sub-sequence.

4. A data processing control section according to claim 3 wherein;

said re-execution control means is a binary storage element conditionable to distinct set and reset states;

said sequence control means is operative to select between said long and short branch sub-sequences at said first predetermined stage in dependence respectively upon existence of said reset and set states in said re-execution control means; and said sequence control means is operative to condition said re-execution control means respectively to said set state during said long branch sub-sequence and to said reset state in said final stage of said sequence.

5. A control section according to claim 4 in which:

said long branch sub-sequence encompasses control of successive operations to manipulate source data and to store and verify result data produced by said manipulation; said verification preceding conditioning of said re-execution control means to said set state; and said short branch encompasses only operations incidental to recovery and utilization of said result data.

6. A control section according to claim 5 wherein:

said result data is stored in regular process storage and back-up saving storage;

said control sequence subsequent to said second predetermined stage encompasses operations resulting in overwriting of said regular process storage; and said short sub-sequence encompasses transferral of said result data between said saving storage and regular storage.

7. In a data processing system improved sequence control apparatus comprising:

sequence control means operative to control original cycling and error dependent recycling of a predetermined plural step sequence of operations, said sequence comprising discrete entry and exit stages and an intermediate sub-sequence of variable length commencing and terminating at respective first and second predetermined intermediate stages of said sequence; said sub-sequence comprising alternately selectable long and short branch sub-sequences;

bistable re-execution control means conditionable to distinct reset and set states for controlling respective selection of said long and short branch sub-sequences by said sequence control means; said reset state being conditioned by operations of said sequence control means prior to said entry stage and at said exit stage; and said set state being conditioned by said sequence control means at a predetermined stage in said long branch sub-sequence.

8. In sequence control apparatus according to claim 16: additional bistable re-execution control means receiving respective set conditioning from said sequence control means at predetermined stages of respective additional long branch sub-sequences occurrent intermediate said second intermediate stage and exit stage of said sequence and receiving joint reset conditioning from said sequence control means at said exit stage of said sequence;

said additional control means controlling selection of said respective additional long branch sub-sequences when in reset condition and controlling alternate selection of respective short branch sub-sequences when in said set condition.

9. Apparatus according to claim 8 wherein said additional control means are general purpose condition triggers having general control functions; wherein the then existing states of said triggers are preserved in back-up storage by operation of said sequence control means prior to first execution of said additional long sub-sequences and restored to said triggers prior to said exit stage of said sequence.

10. In a data processing system containing a fast-access scratchpad store, sequence control section and plural condition triggers associated with sequence branching functions of the control section, the improvement comprising:

the adaptation of said control section to include re-entrant recycling of a plurality of discrete control sequences each containing discrete entry and exit stages and an intermediate stage consisting of alternatively selectable long and short branch sub-sequences which are selectable according to the reset/set state of a predetermined one of said condition triggers;

said long sub-sequence including in succession manipulation of source data, verification of result data produced by said manipulation, said result data and set conditioning of said predetermined one trigger;

said short sub-sequence consisting of retrieval of said saved result data;

said one trigger receiving reset conditioning at said exit stage.

11. Processing system controls according to claim 10 wherein said result saving operation comprises transferral of said verified result data to a predetermined saving location in said scratchpad store.

12. Processing controls according to claim 11 wherein said scratchpad store comprises a plurality of input registers arranged as a queueing pipe-line for receiving and delaying storage of said result data until a corresponding result data representation is verified elsewhere; whereby the ultimate scratchpad location of said result data is not altered prior to completion of said verification.

13. In a data processing system, containing program storage, fast-access temporary storage and sequence controls and which is adapted to execute certain variable field length program instructions by extracting a variable length operand piecemeal from a series of program storage addresses designated by a repeatedly modified basic relative address quantity, by processing said operand piecemeal to produce a variable field length result and by ultimately storing said result piecemeal in program storage locations occupied by said operand, the improvement comprising:

means adapting said controls to first temporarily store said basic address quantity and said piecemeal result in said temporary storage until all pieces thereof have been produced and only thereafter to transfer said result piecemeal from said temporary storage of said program storage;

means for monitoring said system for error during the formation, temporary storage and final program storage of said result and for initiating recycling of said controls upon error;

binary state sequence conditioning means reset prior to each instruction control sequence and set by said adapted controls and monitoring means upon error-free completion of temporary storage of said results and prior to transfer of said result to a program storage;

said controls being conditioned selectively during said recycling to skip over said piecemeal operand process and to proceed directly with said temporary storage to program storage result transfer wherein said sequence conditioning means is in set condition.

14. In a data processing system:

a plurality of binary elements representing sequence branch conditioning triggers; and a sequence control unit adapted in connection with execution of a particular multi-stage sequence to establish all of said elements initially in a reset condition and subsequently during progressive stages of execution of said particular sequence to establish individual said elements in set conditions;

means for monitoring said system for error and for causing said control unit to recycle upon occurrence of error;

said control unit adapted during recycling of said particular sequence to alternately skip or cycle multi-stage skip portions of said sequence when respective said binary elements are respectively in set or reset condition.

* * * * *